V. A. FYNN.
ALTERNATE CURRENT MOTOR.
APPLICATION FILED JUNE 12, 1911.
1,079,332.
Patented Nov. 25, 1913.
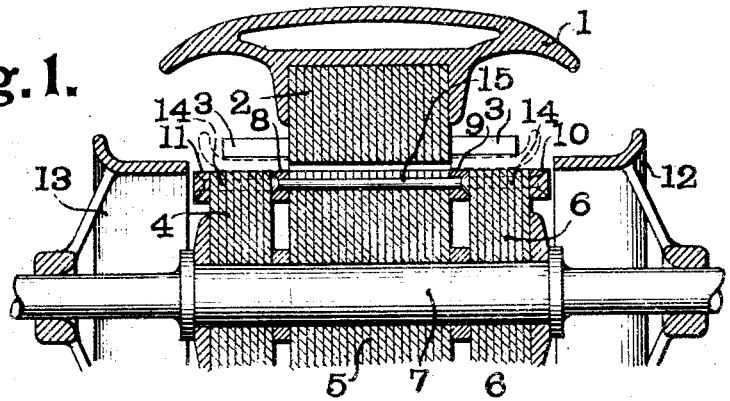
Fig. 1.
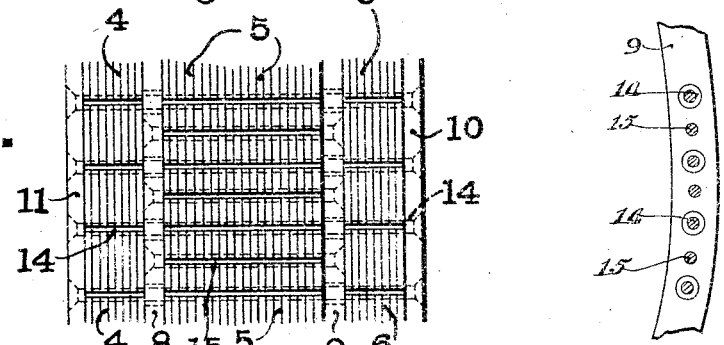
Fig. 2.
Fig. 4.
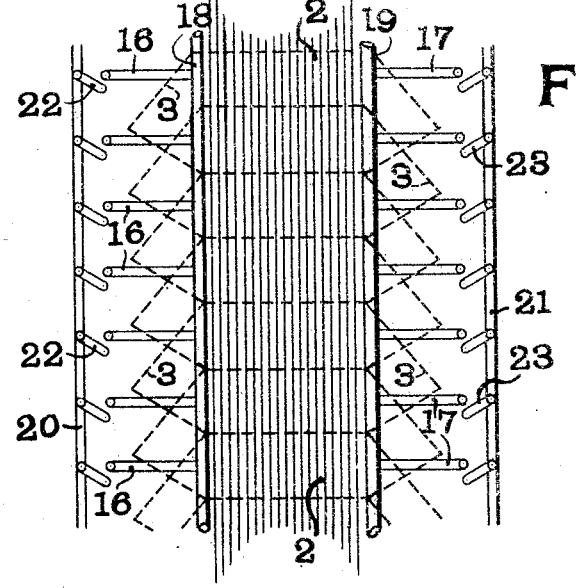
Fig. 3.
WITNESSES:
L. L. Mead,
W. H. Alexander.
INVENTOR
Valère A. Fynn,
BY
E. E. Huffman
ATTORNEY

UNITED STATES PATENT OFFICE.

VALÈRE ALFRED FYNN, OF LONDON, ENGLAND.

ALTERNATE-CURRENT MOTOR.

1,079,332.

Specification of Letters Patent.  Patented Nov. 25, 1913.

Application filed June 12, 1911. Serial No. 632,582.

*To all whom it may concern:*

Be it known that I, VALÈRE ALFRED FYNN, a subject of the King of England, residing at London, England, have invented a certain new and useful Alternate-Current Motor, of which the following is such a full, clear, and exact description as will enable any one skilled in the art to which it appertains to make and use the same, reference being had to the accompanying drawings, forming part of this specification.

My invention relates to alternate current motors either of the single or polyphase type, but is particularly applicable to the latter. Its objects are to enable such machines to be started with a powerful torque per ampere but without the use of slip-rings or the like and to be operated under favorable conditions with but a small "slip" at full load. In order to achieve these objects I have devised an induced or secondary member (usually the rotor) of the novel construction hereinafter set forth. In the preferred form of my invention I make use in conjunction with the said secondary member of a shield or shields adapted to improve the power factor, the overload capacity and the efficiency of the motor. These shields to which I will refer as induction shields, are intended to prevent any inductive transfer of energy between the end windings of the primary and the secondary members and consist of some form of electrically short-circuited winding or its equivalent.

In describing my invention I will refer to the accompanying diagrammatic drawings in which—

Figure 1 shows one form of my improved motor in section; Fig. 2 is a view of part of the secondary member adapted to operate with the stator shown in Fig. 1 or in Fig. 3, and further illustrating the relative positions of the laminations and windings on said secondary member. Fig. 3 shows a stationary form of shield on the stator or primary member of my improved motor and is adapted for coöperation with the motor shown in Fig. 2. Fig. 4 illustrates an end view of the rings short-circuiting the main squirrel-cage bars 15 and indicates that the bars 14 forming the auxiliary squirrel-cage are insulated from the rings 8 and 9.

Referring to Figs. 1 and 2 the stator laminations 2 held in the frame 1 are provided with any desired or convenient primary winding or windings indicated at 3. The rotor is mounted as usual on a shaft 7, but is provided with three groups of laminations 4, 5, 6, of which 5 has approximately the same width as the stator laminations 2 and is so arranged as to revolve within 2. This group of laminations 5 is provided with an ordinary squirrel-cage winding having bars 15 connected to the end-rings 8 and 9. The rotor lamination groups 4 and 6 are arranged at each side of the group 5 and carry an ordinary squirrel-cage winding having bars 14 connected to the end-rings 10 and 11. These bars 14 pass through all the rotor laminations but are insulated from the end rings 8 and 9. Shields 12 and 13 preferably of high conductivity metal are provided at each end of the machine; they are supported on the shaft 7 and can slide along same until inserted between the groups of rotor laminations 4 and 6 and the stator winding or windings 3 which they then separate from the rotor laminations 4 and 6. These shields can be allowed to revolve with the shaft or they may remain stationary while the shaft revolves,—I prefer the latter arrangement. It is quite immaterial whether these shields are supported from the shaft or from the frame of the motor, whether they are movable or stationary and in the form of drums as in Fig. 1 or of windings as in Fig. 3. In any case they should be of low ohmic resistance. If movable and of a form such as is shown in Fig. 1 they must be capable of being introduced at will between the stator end-windings and the secondary member. If in the form of a stationary winding or windings, as in Fig. 3, they must be capable of being short-circuited.

In order to start such a motor it is only necessary to connect the stator, whether wound for polyphase, split-phase or any other mode of operation, to the mains and allow the rotor to come up to speed. After a sufficient speed has been reached the shields 12, 13 are gradually or suddenly pushed home between the stator end windings 3 and those parts 4, 6, of the rotor laminations which project beyond the stator laminations 2.

I prefer to make the squirrel-cage embracing all the rotor laminations of higher ohmic resistance than the squirrel-cage embracing only part of the rotor laminations.

I believe the mode of operation of this motor to be somewhat as follows: Assuming the stator to be connected to a polyphase supply and inclosing the improved rotor herein described then the self-induction or the reactance of the whole system will be considerably greater than if a squirrel-cage rotor of ordinary construction had been placed within said stator. This increased reactance will be due to the groups of rotor laminations 4 and 6 placed in close proximity to the end windings or connections of the stator windings. At starting the apparent reluctance of the group of rotor laminations 5 will naturally be very great owing to the screening effect of the low resistance squirrel-cage which it carries; the leakage field surrounding the end windings will consequently tend to be great and the presence of the laminations 4 and 6 will greatly increase this tendency. Under normal running conditions the apparent reluctance of the group 5 will be considerably reduced and the leakage field surrounding the end windings will diminish very materially even if the groups of laminations 4 and 6 be not removed. The increased reactance of the system at starting will obviously reduce the current taken by the motor at starting, on the other hand the torque will be increased because the currents induced by the leakage fields in the high resistance squirrel-cage, which embraces all the rotor laminations are nearly in phase with those fluxes with which they produce torque. Because the high resistance squirrel-cage bars thread all the rotor laminations they are placed in a position to produce torque with all the fluxes threading the rotor laminations, therefore also with the comparatively large fluxes threading the group of laminations 5. As the machine increases its speed so does the effect of the high resistance squirrel cage winding diminish while the torque producing qualities of the low resistance squirrel cage increase rapidly and in a manner now well understood. It is quite feasible to operate the machine without further change but I prefer at some time during the starting period to introduce the shields 12, 13 between the stator end windings and the auxiliary groups of rotor laminations until said shields occupy positions as dotted in Fig. 1. When in such a position said shields serve two purposes. They first reduce the leakage field surrounding the stator end windings whereby the overload capacity and the power factor of the motor are increased and they also reduce the reactance of the high resistance squirrel-cage whereby the overload capacity, the efficiency and the power factor of the machine are also improved.

It is, of course, not necessary to make use of both auxiliary groups of rotor laminations 4 and 6. One only of these may be used.

The shields shown in Fig. 1 are in the form of copper drums and therefore are always ready to act as shields as long as they are located between the stator end windings and the auxiliary rotor laminations. In Fig. 3 are shown two shields in the form of squirrel cage windings. The bars 16 and 17 are always connected to the connectors 18 and 19 respectively but the connectors 20 and 21 may be connected to or disconnected from the two groups bars by means of the switches 22 and 23 respectively. As long as the switches 22 and 23 are open the squirrel-cage windings on the stator are inoperative and produce no screening or shielding effect. When said switches are closed the squirrel cage windings of Fig. 3 are as effective as the drums 12, 13 of Fig. 1, when in the dotted positions 14. When using stationary shields in the form of windings I leave these windings open at starting and short-circuit them after a sufficient speed has been reached.

Having fully described my invention, what I claim as new and desire to secure by Letters Patent of the United States, is:

1. In an alternating current motor, the combination with an inducing member having a group of laminations and windings partly embedded therein and partly projecting beyond said laminations, of an induced member having a plurality of groups of laminations, one of said groups being of substantially the same width as the laminations of the inducing member and in line therewith, a winding embracing said group only, and a second winding on the induced member embracing a plurality of groups of laminations and in inductive relation with projecting portions of the inducing windings.

2. In an alternating current motor, the combination with a laminated inducing member, of an induced member of greater width than the inducing member and provided with a plurality of groups of laminations, one of said groups being of substantially the same width as the laminations of the inducing member and in line therewith, a permanently short-circuited winding embracing said group only and a second winding on the induced member of higher resistance than the first and embracing a plurality of groups of laminations.

3. In an alternating current motor, the combination with an inducing member, of an induced member provided with a main and two auxiliary groups of laminations, a winding embracing the main group only and a second winding of higher resistance than the first and embracing both the main and the auxiliary groups of laminations.

4. In an alternating current motor, the combination with an inducing member, of an induced member provided with a main and an auxiliary group of laminations, a winding embracing the main group only, and a second winding of higher resistance than the first embracing both the main and auxiliary groups of laminations.

5. In an alternating current motor, the combination with an inducing member, of an induced member provided with a main and an auxiliary group of laminations, a winding embracing the main group only, a second winding embracing both the main and auxiliary groups of laminations, and means for varying the reactance of the second winding.

6. In an alternating current motor, the combination with an inducing member, of an induced member provided with a main and an auxiliary group of laminations, a winding embracing the main group only, a second winding embracing both the main and auxiliary groups of laminations, and a shield for the auxiliary group of laminations.

7. In an alternating current motor, the combination with an inducing member having an inducing winding, of an induced member provided with a main and an auxiliary group of laminations, a winding embracing the main group only, a second winding embracing both the main and auxiliary groups of laminations, and an induction shield or screen between the end windings of the inducing member and the auxiliary group of laminations.

8. In an alternating current motor, the combination with an inducing member having an inducing winding, of an induced member provided with a main and an auxiliary group of laminations, a winding embracing the main group only, a second winding embracing both the main and auxiliary groups of laminations, an auxiliary winding between the end windings of the inducing member and the auxiliary group of laminations, and means for short-circuiting said auxiliary winding.

In testimony whereof, I have hereunto set my hand and affixed my seal in the presence of the two subscribing witnesses.

VALÈRE ALFRED FYNN. [L. S.]

Witnesses:
　W. A. ALEXANDER,
　ELIZABETH BAILEY.